United States Patent Office 2,808,913
Patented Oct. 8, 1957

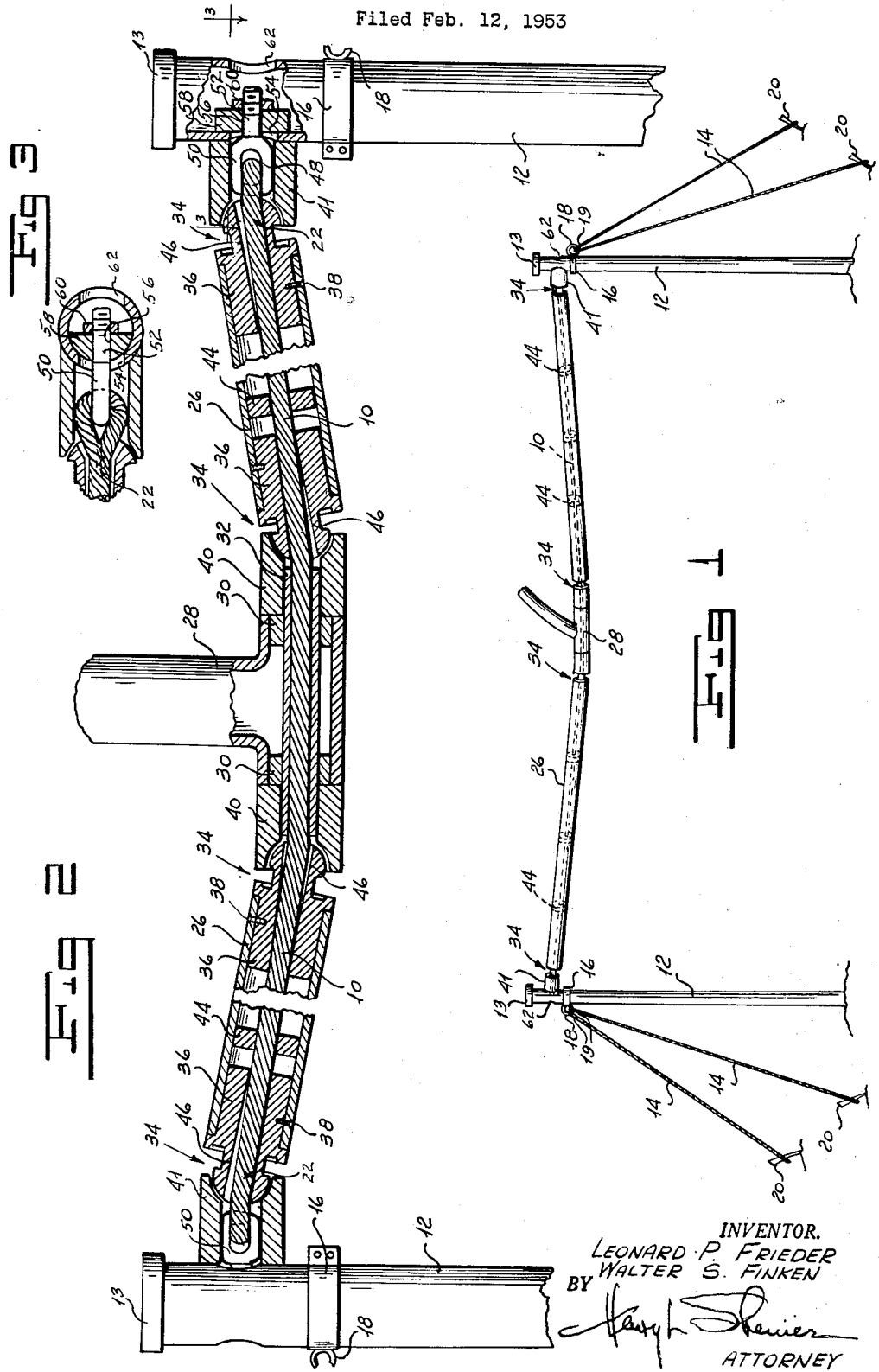

2,808,913

CATENARY SUPPORTING CABLE CONSTRUCTION

Leonard P. Frieder, Great Neck, and Walter S. Finken, Brooklyn, N. Y.; said Finken assignor to said Frieder Application February 12, 1953, Serial No. 336,482

7 Claims. (Cl. 189—34)

Our invention relates to an improvement in catenary supporting cable construction.

Catenary cables have long been used to support large loads over a long span without the use of intermediate supporting members. In our copending application, Serial No. 297,006, filed July 3, 1952, now Patent No. 2,693,195, we have disclosed broadly a catenary supporting cable construction for use in portable shelters. In this construction centenary cables supporting crescent trusses to which loads are applied are supported between a pair of poles. To reduce the bending moments on these poles and the tension on the guy wires supporting the poles, we provided compression members surrounding the cable which absorb part of the load applied to the guy wires. In such a construction it is desirable that the cable assume a position as close as possible to catenary form and where compression members are used, means should be provided to prevent seizure of the cable between compression members. We have invented an improved structure which ensures that the cable will assume a position close to catenary form and which eliminates the possibility of seizure of the cable between compression members as well as providing an improved means for attaching the cables to the end poles.

One object of our invention is to provide an improved catenary supporting cable construction wherein compression members are used which are joined by knuckle joints without the use of bolts.

Another object of our invention is to provide a catenary supporting cable construction using compression members joined by knuckle joints wherein the male members of the joints have tapered holes to ensure that the cable assumes a position as close as possible to catenary form.

A further object of our invention is the provision of an improved catenary suporting cable construction in which thimble members for receiving a load are rotatably supported with respect to the cable itself.

Other and further objects of our invention will appear from the following description.

In the accompanying drawings which form part of the instant specification and which are to be read in conjunction therewith and in which like reference numerals are used to indicate like parts in the various views:

Figure 1 is a perspective view of our improved catenary supporting cable construction.

Figure 2 is an enlarged view partly in section of our improved catenary supporting cable construction.

Figure 3 is a sectional view taken along the line 3—3 of Figure 2.

In general our invention contemplates the provision of an improved catenary supporting cable construction in which compression members surround the cable to absorb part of the load applied to the guy wires. A number of knuckle joints connect these compression members and the male members of the joints are provided with tapered holes so that the cable will assume a position as close as possible to catenary form. We also provide thimble members rotatably mounted with respect to the cable for receiving the load and transmitting it to the cable and specific means for attaching the cable to the end poles.

More particularly, referring now to the drawings, a catenary supporting cable 10 is supported between a pair of tubular end poles 12 having crowns 13 and which are held in an upright position by means of guys 14 attached to the end poles in any appropriate manner as by brackets 16 having eyes 18 and attached to stakes 20 fixed in the earth. Guys 14 are attached to eyes 18 by appropriate means such as eye splices 19. The ends of the cable 10 are spliced at a point indicated by reference character 22 to form loops passing through the eyes 48 of eyebolts 50 having shanks 52. We form each of the shanks 52 with a noncircular cross-sectional shape up to the point where the thread begins. Shanks 52 extend through openings 54 in the walls of end poles 12 and through holes 56 in contour pads 58 inside poles 12. Contour pads 58 are shaped to register with the interior surface of the corresponding pole 12 and holes 56 have noncircular cross-sectional shapes corresponding to those of shanks 52. We thread nuts 60 on the ends of shanks 52 and provide second openings 62 in poles 12 for access to nuts 60.

When a load is applied to the cable, bending moments on the end poles will tend to pull the tops of the poles toward each other, and this tendency is resisted by guys 14. Where the loads are extremely large and the span of great length, it is extremely difficult to drive stakes 20 into the ground securely enough to enable guys 14 to overcome this movement. In order to minimize this difficulty and to absorb some of the load applied to the guys, we provide a plurality of tubular compression members 26 surrounding the cable 10 throughout its length. When tension on the cable tends to pull the tops of the end poles together, the compression members 26 resist the pull, thus reducing the tension on the guys 14 and the pull on stakes 20.

Between each pair of compression members 26 at the points at which the load is to be applied, we provide thimble or shoe members 28 adapted to transmit the load to be supported to the catenary cable. We mount the thimbles on a pair of bushings 30 arranged on a sleeve 32 surrounding the cable. Since we mount members 28 on bushings, they can rotate with respect to the cable to accommodate shifts in direction of the force applied by the load.

To join the compression members with the thimble member 28 in such a manner as to ensure an efficient transmission of the compressive forces, we provide a plurality of knuckle joints indicated generally at 34. These knuckle joints 34 are made up of male members 36 which may be fixed in the ends of compression members 26 by suitable means such as screws 38 and female members 40 secured to sleeves 32 in any desired manner as by welding, for example. For joining the compression members to the end poles, we provide similar knuckle joints 34. The female members 41 of these joints surround splice 22 and eyebolt 50, and the ends of the members 41 adjacent the poles 12 are shaped to conform with the outer surfaces of the end poles.

Along the length of cable 10, within the compression members 26, we dispose spacers or positioning members 44 to maintain the central location of the cable with respect to the compression members and to prevent members 26 from buckling under compression. It will be noted that we form the male members 36 of the knuckle joints with tapered holes indicated by reference numeral 46. These tapered holes prevent seizure of the cable when the joints are flexed and permit the cable to assume a position conforming more nearly with catenary form.

It is to be emphasized that any number of compression members 26 may be used, depending upon the length of the span. In addition, we may employ a plurality of thimble members to support a plurality of loads and join the thimble members to the compression members in the manner shown.

In use, a load is applied to the cable through a member inserted in thimble 28 which is rotatably mounted with respect to the cable so as to be positioned in conformity with the direction from which the load is applied. When the load is applied, the cable will be under tension and tend to draw the tops of end poles 12 together. Compression members 26 will resist this tendency. That is, in operation they reduce the bending moments on the end poles and thus the tension on guys 14 and the pull on stakes 20. Our knuckle joints 34 insure that the compressive forces will be transmitted efficiently through the compression members along the length of the cable regardless of the degree to which the cable is flexed. The tapered holes in the male members of the joints permit the cable to assume a more natural position at the points at which it is deflected and thus prevent seizure.

It will be appreciated that the cable 10 will stretch when under tension. This stretch is compensated for by turning nuts 60 to draw eyebolts 50 into the end poles to take up the slack. Bolts 50 are prevented from turning during this operation by the noncircular cross-sectional shape of their shanks, the corresponding cross-sectional shape of holes 56 and the shape of contour pads 58.

It will be seen that we have accomplished the objects of our invention. We have provided a caternary supporting cable construction using compression members in which the compressive forces are efficiently distributed, notwithstanding the degree to which the cable is flexed. We have provided a rotatably supported thimble member for receiving loads which will accommodate shifts in the direction of the load. In addition, we have provided a specific means for securing the cable to the poles whereby slack due to cable stretch can be taken up and an over-all structure which enables the cable to assume a position as close as possible to caternary form.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A caternary supporting cable construction comprising in combination a cable, a pair of members between which said cable is suspended, a plurality of compression members freely carried by said cable and disposed along the length thereof, and pivotal means providing connections between said compression members, said pivotal connecting means being constructed to permit relative movement along the length of said cable between a pair of connected compression members.

2. A catenary supporting cable construction as in claim 1 wherein said pivotal means are knuckle joints, said joints including male members having tapered holes therein through which said cable passes and female members having recesses for the reception of said male members.

3. A catenary supporting cable construction as in claim 1 wherein said compression members are tubular and fitted with positioning means having holes through which the cable is passed, said positioning means maintaining the cable substantially coaxial with said compression members and preventing the compression members from collapsing under compression.

4. A catenary supporting cable construction as in claim 1 including adjustable means for attaching said cable to each of said pair of members.

5. A catenary supporting cable construction comprising in combination a cable, a pair of end members between which said cable is suspended, a plurality of compression members disposed along the length of said cable, a load-receiving thimble member positioned between a pair of said compression members, means for rotatably supporting said thimble member with respect to the cable, and pivotal means connecting the compression members adjacent the ends of said cable to said pair of end members, and pivotal means connecting said thimble member to adjacent compression members.

6. A catenary supporting cable construction as in claim 5 including pivotal means connecting contiguous compression members with one another.

7. A catenary supporting cable construction as in claim 5 wherein said means for supporting the thimble members includes a sleeve surrounding the cable and bearing means carried by said sleeve.

References Cited in the file of this patent

UNITED STATES PATENTS

| | | |
|---|---|---|
| 989,539 | Seeberger | Apr. 11, 1911 |
| 2,622,546 | Kramrisch | Dec. 23, 1952 |
| 2,693,195 | Frieder et al. | Nov. 2, 1954 |
| 2,704,522 | Frieder et al. | Mar. 22, 1955 |

FOREIGN PATENTS

| | | |
|---|---|---|
| 3,909 | Great Britain | Oct. 23, 1877 |